Sept. 2, 1958 R. W. DOCHTERMAN 2,850,336
BEARING LUBRICATING MEANS
Filed Dec. 28, 1955
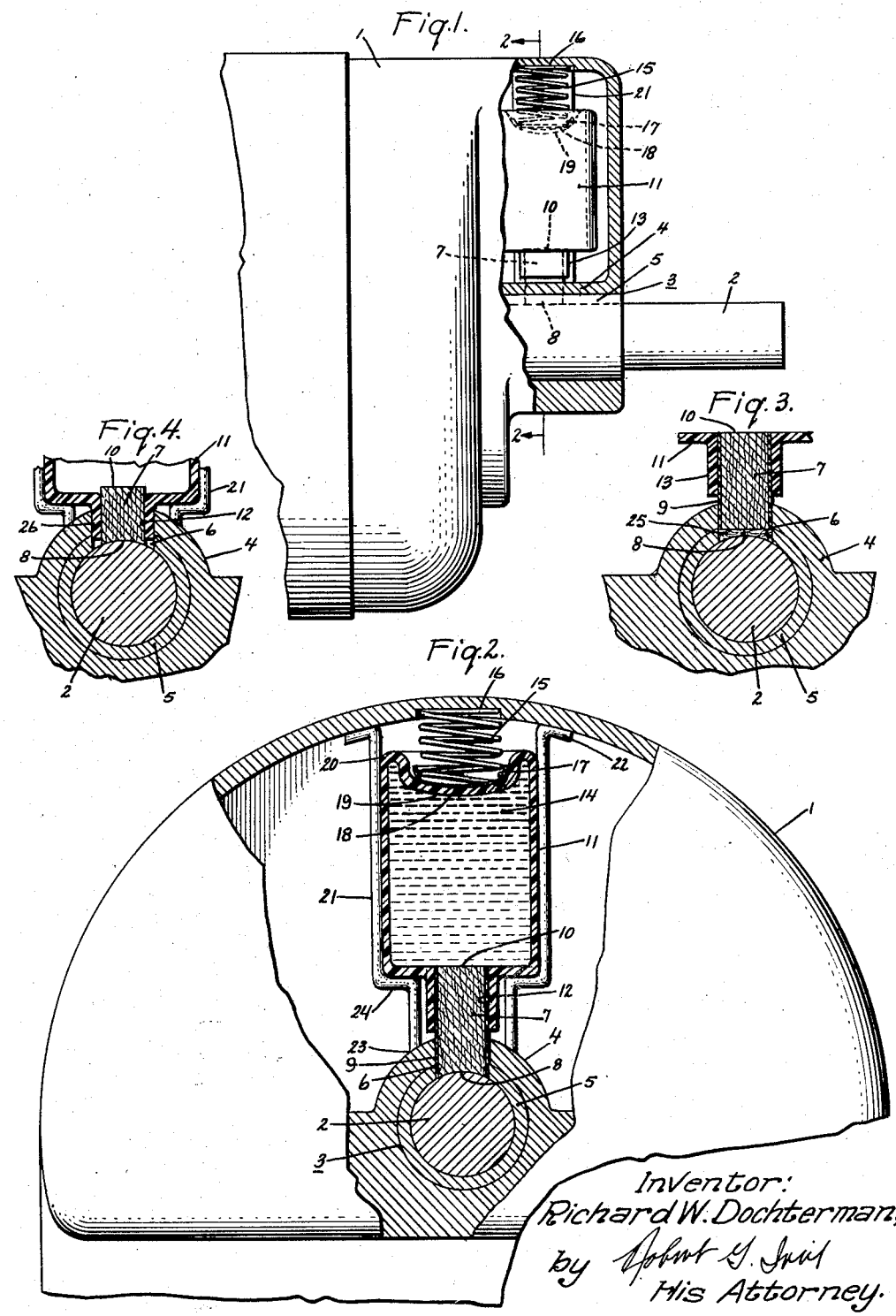
Inventor:
Richard W. Dochterman,
by *[signature]*
His Attorney.

United States Patent Office 2,850,336
Patented Sept. 2, 1958

2,850,336

BEARING LUBRICATING MEANS

Richard W. Dochterman, Fort Wayne, Ind., assignor to General Electric Company, a corporation of New York Application December 28, 1955, Serial No. 555,941

7 Claims. (Cl. 308—125)

This invention relates to bearings for rotatably supporting shaft members, and more particularly to improved lubricating means therefor.

The problem of providing adequate lubrication over an extended period for bearings which support rotatable members has generally been met, insofar as small equipment such as fractional horsepower motors are concerned, by providing in the vicinity of the bearing some type of material which will absorb lubricant and act as a reservoir. The lubricant in this material is then passed to the shaft through appropriate wicking so that the lubricant contained in the material is gradually transmitted to the shaft surface. Such a system necessarily utilizes a considerable amount of space for the mass of material. It is most desirable to provide a system in which there is provided a supply of lubricant in substantially free form which will eliminate the requirement for a material to act as a reservoir. In combination with such a supply, it is necessary that suitable means be provided to insure that the lubricant be transmitted to the surface of the bearing at a proper rate of speed. In addition, it is desirable that there be no egress for the lubricant from its container except to the bearing surface, because the usual lubricant is subject to evaporation and oxidation when exposed to the oxygen in the air, and will creep out of its container.

It is, therefore, an object of this invention to provide lubricating means which will incorporate the desirable features set forth above.

Further objects and advantages will become apparent and the invention will be better understood by reference to the following description and the accompanying drawing, and the features of novelty which characterize this invention will be pointed out with particularity in the claims annexed to and forming a part of this specification.

In its broader aspect, the invention provides bearing lubricating means for a rotatable member which comprise a sealed flexible container having an opening provided therein. Metering means are sealed in the opening, and a quantity of lubricant is provided within the container in contact with the metering means which is arranged to conduct the lubricant to the rotatable member at a predetermined rate of speed. Where the lubricant container is not directly over the rotatable member or is not held in a non-liquid form (on the order of grease), it is desirable to provide biasing means which will act upon the container to maintain the lubricant in contact with the metering means regardless of the position of the container.

In the drawing, Figure 1 is a fragmentary side view, partly in cross section, of a machine incorporating the preferred embodiment of the improved bearing lubricating system of this invention;

Figure 2 is a broken-away view, partly in cross section, along line 2—2 in Figure 1;

Figure 3 is a fragmentary view in cross section showing a second embodiment of the invention; and Figure 4 is a fragmentary view in cross section showing yet another embodiment of the invention.

Referring now to Figures 1 and 2 of the drawing, there is shown a housing 1 of a machine (not otherwise shown) which drives a shaft member 2 rotatably supported in bearing member 3, which may be formed integral with the housing 1. In its simplest form, bearing 3 includes a sleeve portion 4 whose inner surface is generally coated with a layer 5 of any standard bearing material. In order to supply lubricant to the bearing surface, an opening 6 is formed in sleeve member 4 and a metering device 7 is arranged to have one end 8 extending into the opening 6 to a position adjacent shaft 2. Device 7 is preferably formed from a bar of material of controlled porosity, such as carbon or sintered bronze, so that lubricant can pass through device 7 by capillary action at a rate controlled by the degree of porosity. The outer surface of device 7 has a sealing coating 9 of any desired suitable material to prevent the lubricant from escaping through the sides of the device. In this manner, the device is open to lubricant only at its ends 8 and 10 so that lubricant may be taken in by the device at end 10 and transferred to the surface to be lubricated at end 8.

A sealed container 11, formed of an oil-resistant flexible material of a type suitable for hermetically sealing in fluids, such as polyethylene film or synthetic rubber, for instance, is provided with an opening 12 at one end thereof. While a container formed in its entirety of flexible material has been described, it will be understood that the invention includes containers partly formed of rigid material and partly of flexible material, provided the quality of flexibility is present as desired, and that the parts are properly bonded to effect the necessary sealed enclosure. The container walls 13 forming the opening 12 are arranged to fit snugly about the outer surface of device 7 and are bonded thereto so as to form a hermetic seal therewith. In this manner, the only egress for lubricant 14, which may be in liquid form, as shown, contained within container 11 is through end 8 of metering device 7. The lubricant 14 may be simply introduced into container 11 by injecting it through a small opening formed therein and subsequently sealing the opening in a conventional manner, as is well known in the art.

Device 7 will, through capillary action, feed lubricant at a controlled rate through end 8 to the bearing surface, no matter what the position of the device with respect to the shaft. However, particularly where free liquid lubricant is used, in order to obtain proper operation in all positions, it is desirable to provide biasing means to decrease the volume of container 11 as the amount of lubricant 14 decreases so as to insure that the lubricant 14 within the container 11 will always remain in contact with end 10 of device 7, even when part of the lubricant has been utilized. To achieve this effect, a suitable biasing device such as spring 15 may be provided; this spring is seated at one end in a suitable recess 16 provided in housing 1 and at its other end in a cup-shaped member 17 which has its base 18 seated against the outer end 19 of container 11. Cup member 17 has a diameter slightly smaller than that of container 11 so that as the amount of lubricant 14 in the container decreases and spring member 15 moves cup member 17 forward, the container 11 can fold back, as shown at 20 around the cup member which acts as a guide.

In order to maintain the container 11 suitably stationary within the machine for all positions of operation of the machine, it is generally preferable to provide some sort of supporting structure such as tubular member 21, which is secured to the outer housing 1 at 22 and to the sleeve member 4 at 23. The tubular member 21 is preferably arranged to fit relatively loosely around container 11 so that it will not impede the container from folding back, as shown at 20, but will maintain it in the desired position regardless of the position of the machine. Member 21 may also be provided with a flange 24 to preclude undesirable radial motion of container 11 relative to shaft 2.

In this manner, an ample supply of lubricant in its free form is provided thereby eliminating the necessity for masses of absorbent material and the like which take up considerable space and decrease the space available for the supply of lubricant. In addition, the fact that the container is hermetically sealed, with the only outlet being through metering device 7, means that there can be no loss whatsoever of lubricant and that all lubricant which escapes from the container 11 must do so through end 8 of the metering device and thus be released at the point where it does useful work.

Referring now to Figure 3, there will be described a second embodiment of the invention using like numerals for like parts. As before, a sleeve member 4 having a bearing suurface coating 5 is arranged in rotatable engagement with shaft 2, with an opening 6 being provided in sleeve 4. Metering device 7 again is hermetically sealed to wall 13 of container 11. End 8 of metering device 7 again extends into the opening 6 within bearing sleeve 4, as in the embodiment of Figures 1 and 2. However, in this embodiment, there is provided a small amount of absorbent wicking material 25, such as felt, between end 8 of the metering device and shaft 2. As before, the lubricant passes through metering device 7 at a rate controlled by the porosity of the metering device, and comes out through end 8. However, the fact that the device is no longer in a position to be in contact with the shaft 2 precludes any possibility whatsoever that the device may wear from contact with the shaft. Such an arrangement is particularly desirable where the container 11 and metering device 7 are not rigidly anchored in place so as to maintain the metering device 7 in predetermined relation to the shaft 2. Lubrication is obtained in substantially the same manner as before; in this case, however, the lubricant is passed to absorbent material 25 which in turn is in contact with the shaft so as to lubricate it.

Referring now to Figure 4 of the drawing, there will be described yet another embodiment of the invention, with like parts being provided with like numerals. As before, sleeve 4, provided with bearing surface 5, is in contact with shaft 2 and has an opening 6 provided therein, with metering device 7 extending through the opening and having its end 8 adjacent the surface of shaft 2. Container 11 again is arranged to be filled with lubricant and to be hermetically sealed so as to prevent escape of lubricant except through end 10 of metering device 7. Metering device 7 has no insulating covering (such as that indicated at 9 in Figure 3) provided on its outer surface. Instead, the wall 26 which forms opening 12 in container 11 is arranged to be in engagement with the metering device 7 to a point well within sleeve 4 and adjacent shaft 2. The wall 26 is bonded to metering device 7 so as to form a hermetic seal therewith and so as to fulfill the function of covering 9 of Figure 2. In this manner, the container 11 achieves not only the purpose of containing the lubricant in a hermetically sealed condition, but also insures that all escape for the lubricant before it reaches end 8 of device 7 is precluded. The operation of the construction is the same as that described in connection with Figures 1 and 2.

It will be seen from the foregoing that this invention provides an improved bearing lubricating arrangement whereby an increased amount of lubricant may be provided in order to insure a longer life to the bearings without any re-lubrication thereof other than that occurring automatically from the construction just described. In addition, the invention insures that this free supply of lubricant may be used in substantially any position of operation of the machine of which it forms a part and that it will be transferred to the surfaces to be lubricated at a controlled rate without any loss of lubricant at any point other than that from which it is fed to the surfaces to be lubricated.

While the invention has been explained by describing particular embodiments thereof, it will be apparent that improvements and modifications may be made without departing from the scope of the invention as defined in the appended claims.

What I claim as new and desire to secure by Letters Patent of the United States is:

1. Bearing lubricating means for a rotatable member comprising a hermetically sealed flexible container having an opening therein, a quantity of lubricant in said container, metering means comprising a member formed of a material of predetermined porosity sealed in said opening with one end thereof in contact with said lubricant in said container and the other end thereof adjacent said rotatable member, said metering means member constantly receiving lubricant at said one end thereof and at all radial mounting positions of said container with respect to said rotatable member, said metering means having its sides covered with a sealing substance thereby to restrict egress of said lubricant to said other end, and biasing means in contact with said container to decrease the volume thereof as said lubricant is used thereby to maintain said lubricant in contact with said metering means.

2. In a machine having a housing, sleeve bearing means formed in said housing, and a rotatable member supported in said bearing means, improved bearing lubricating means comprising a hermetically sealed flexible container positioned between said housing and said bearing means and having an opening formed in the end thereof toward said bearing means, a quantity of liquid lubricant in said container, a bar member formed of a material of predetermined porosity sealed in said opening with one end thereof in contact with said lubricant in said container and the other end thereof adjacent said rotatable member, said bar member constantly receiving lubricant at said one end thereof and at all radial mounting positions of said container with respect to said rotatable member, a spring member positioned between said housing and said container thereby to exert a predetermined force on said container, and support means extending between said sleeve member and said housing to support and position said container and said bar member.

3. Bearing lubricating means for a rotatable member comprising a hermetically sealed flexible container having an opening therein, a quantity of lubricant in said container, metering means comprising a member formed of a material of predetermined porosity sealed in said opening with one end thereof in contact with said lubricant in said container and the other end thereof adjacent said rotatable member, said metering means member constantly receiving lubricant at said one end thereof and at all radial mounting positions of said container with respect to said rotatable member, a predetermined amount of absorbent wicking material arranged between and in contact with said other end and said rotatable member, said metering means having its sides covered with a sealing substance thereby to restrict egress of said lubricant to said other end, and biasing means in contact with said container to decrease the volume thereof as said lubricant is used thereby to maintain said lubricant in contact with said metering means.

4. Bearing lubricating means for a rotatable member comprising a hermetically sealed flexible container having an opening therein, a quantity of lubricant in said container, metering means comprising a member formed of a material of predetermined porosity sealed in said opening with one end thereof in contact with said lubricant in said container and the other end thereof adjacent said rotatable member, said metering means member constantly receiving lubricant at said one end thereof and at all radial mounting positions of said container with respect to said rotatable member, the sides of said container opening being formed to fit around said metering means to a point adjacent said other end thereof and being sealed thereto, and biasing means in contact with said container to decrease the volume thereof as said lubricant is used thereby to maintain said lubricant in contact with said metering means.

5. In a machine having a housing, a sleeve bearing member formed in said housing and having an opening formed therein, and a shaft member rotatably supported in said bearing member, improved bearing lubricating means comprising a sealed flexible container positioned between said housing and said bearing member and having an opening formed in the end thereof toward said bearing member, a quantity of liquid lubricant in said container, a bar member formed of a material of predetermined porosity sealed in said opening with one end thereof in contact with said lubricant in said container and the other end thereof extending into said sleeve member opening adjacent said shaft member, a predetermined amount of absorbent wicking material arranged between and in contact with said other end and said shaft member, and biasing means in contact with said container to decrease the volume thereof as said lubricant is used.

6. In a machine having a housing, a sleeve bearing member formed in said housing and having an opening formed therein, and a shaft member rotatably supported in said bearing member, improved bearing lubricating means comprising a sealed flexible container positioned between said housing and said bearing member and having an opening formed in the end thereof toward said bearing member, a quantity of lubricant in said container, a bar member formed of a material of predetermined porosity sealed in said opening with one end thereof in contact with said lubricant in said container and the other end thereof extending into said sleeve member opening adjacent said shaft member the sides of said container opening being formed to fit around said metering means in sealed relation thereto and extend into said bearing member opening.

7. In a machine having a housing, a bearing mounted in said housing, and a shaft rotatably supported in said bearing, bearing lubrication means comprising a hermetically sealed flexible container for liquid lubricant positioned adjacent said bearing and having an opening formed therein, a metering member formed of a material of predetermined porosity sealed in said opening with one end thereof exposed for contact with the lubricant in said container and with the other end thereof adjacent said shaft, resilient means engaging said container to exert pressure thereon for maintaining the lubricant therein in contact with said one end of said metering member, said metering member constantly receiving lubricant at said one end and at all radial mounting positions of said container with respect to said shaft, and support means mounted in said housing for supporting and positioning said container and said metering member.

References Cited in the file of this patent

UNITED STATES PATENTS

| | | |
|---|---|---|
| 890,735 | Van Doren | June 16, 1908 |
| 982,165 | Whitney | June 17, 1911 |
| 1,465,620 | Anderson | Aug. 25, 1923 |
| 2,593,972 | Bray | Apr. 22, 1952 |
| 2,760,599 | Sunden | Aug. 28, 1956 |